June 7, 1938.  H. J. MINTERT ET AL  2,119,596
BOX DUMPING MACHINE
Filed June 23, 1936  4 Sheets-Sheet 2

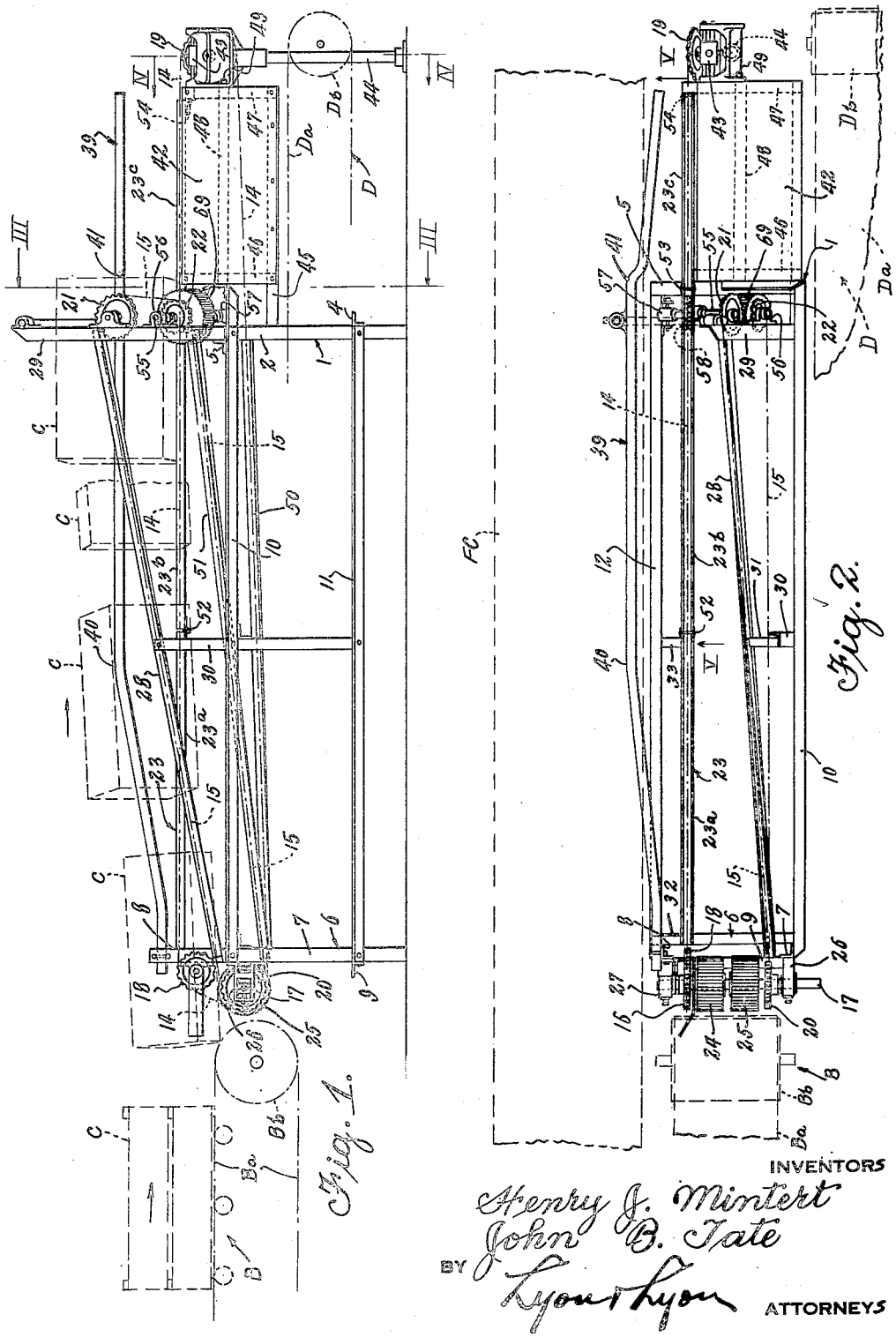

INVENTORS
Henry J. Mintert
John B. Tate
BY Lyon & Lyon
ATTORNEYS

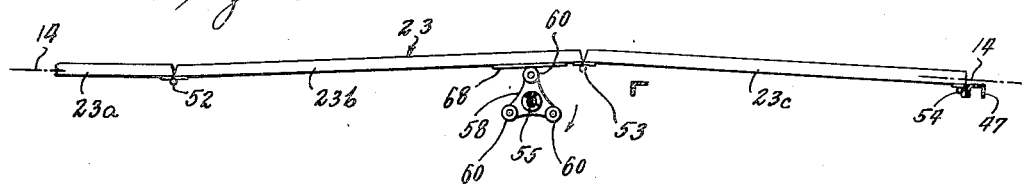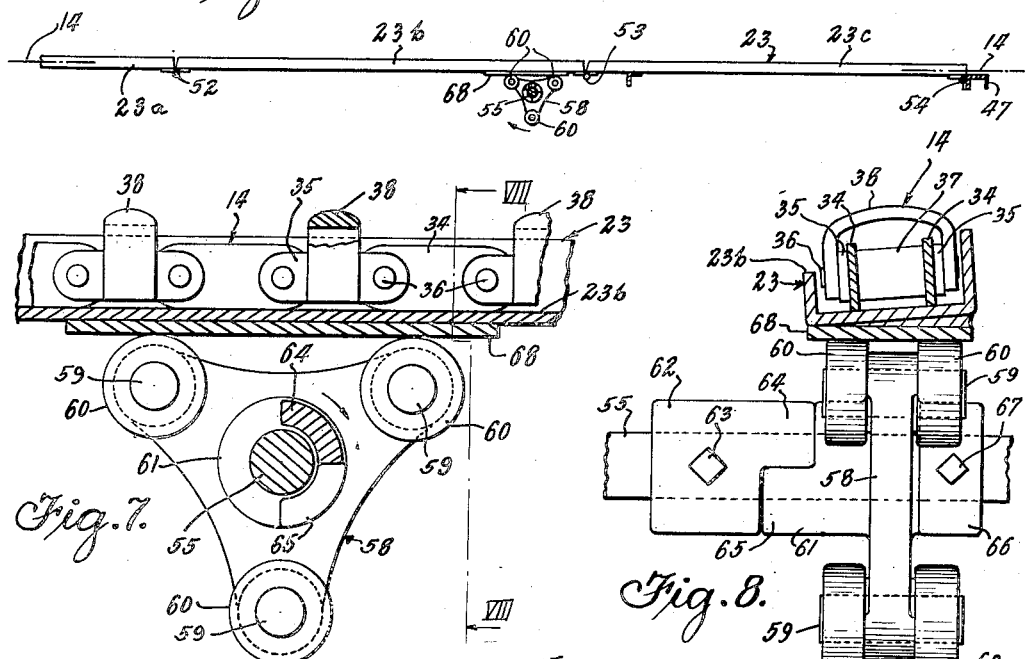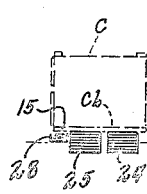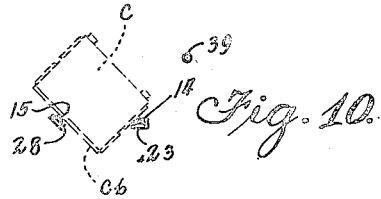

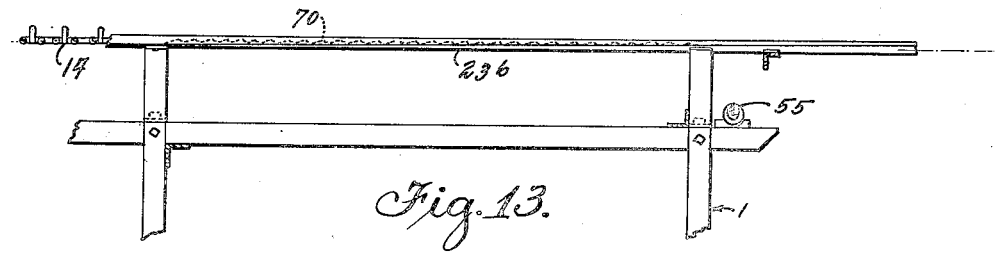
Fig. 13.
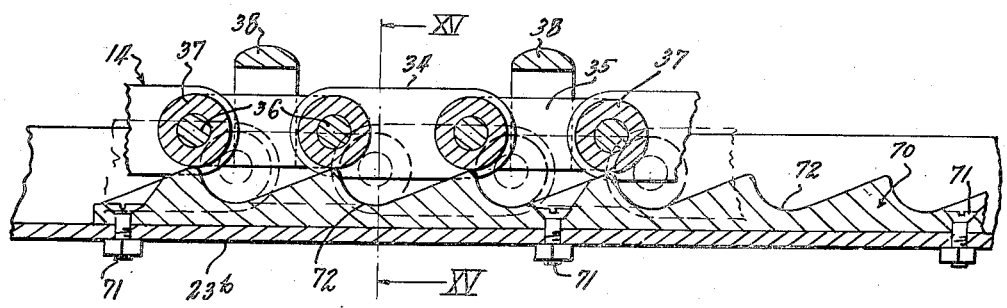
Fig. 14.
Fig. 15.
INVENTORS
Henry J. Mintert
John B. Tate
BY Lyon & Lyon
ATTORNEYS

UNITED STATES PATENT OFFICE 2,119,596

BOX DUMPING MACHINE

Henry J. Mintert and John B. Tate, Riverside, Calif., assignors to Food Machinery Corporation, San Jose, Calif., a corporation of Delaware Application June 23, 1936, Serial No. 86,782

13 Claims. (Cl. 214—1.1)

Our invention relates to box dumping machines and has particular reference to a machine adapted to receive a box, filled with contents, and to convey the same along the length of said machine, and while so doing, to tip said box either upon its side or to substantially invert the same so as to dump the contents therefrom.

In certain packing industries, the articles to be packed are received in boxes or containers from which these articles must be removed in order to permit treating, grading and proper packing thereof in suitable packages for commercial delivery.

In the citrus industry, for example, the oranges, lemons and grapefruit are picked from the trees in the groves and placed in boxes known as "field" boxes, such field boxes being filled with the fruit in various sizes and grades, just as they are found upon the trees. These field boxes, filled with the fruit, are then transported to the packing house where the fruit is passed through washers, graders, sizers and sorters and other processing machines, preparatory to delivering the same to the packing tables where the fruit is packed into their final containers.

In order to facilitate the handling of the field boxes of fruit as they enter the packing establishment, a box conveyer ordinarily extends from the entrance of the packing house to a fruit conveyer belt on which the fruit is to be dumped, and by which the loose fruit is carried to the washing and processing machines.

Our invention relates particularly to a machine to be interposed between the field box conveyer and the fruit conveyer belt, for the purpose of receiving such field boxes and automatically inverting the same to dump the contents onto the fruit conveyer belt after which the empty boxes are restored to their upright position and are ejected from the box dumping machine, ready for redelivery to the field for further use.

There are now upon the market various machines for receiving filled boxes and for dumping the same, such machines ordinarily including rather complicated mechanism for carrying the boxes into and through the machines and causing the boxes to be inverted as they pass through the machine.

It is, therefore, an object of our invention to provide a box dumping machine of relatively simple construction and relatively inexpensive to manufacture and maintain.

Another object of our invention is to provide a box dumping machine wherein a pair of endless chains are employed for receiving and conveying boxes through the machine and the path of travel of the chains is such that during the passage of the box through the machine the boxes will be substantially inverted.

Another object of our invention is to provide a machine of the character set forth in the preceding paragraph wherein one of the chains is adapted to engage along the side of the boxes passing through the machine, while the other of the chains engages the bottom of the boxes, the latter chain traveling through a relatively great angle to the horizontal to lift the bottom of the box, tipping the box over upon its side, and rotating the box about the first chain.

Another object of our invention is to provide a box dumping machine of the character set forth, wherein when the box is substantially inverted the conveying mechanism supporting the box is vibrated or jarred for the purpose of insuring complete removal of the contents from the box.

Another object of our invention is to provide a machine of the character set forth, wherein after the boxes have been inverted to dump their contents, they are restored to their normal upright position and are ejected from the machine in this position.

Other objects and advantages will be apparent from a study of the following specifications read in connection with the accompanying drawings, wherein Figure 1 is a side elevational view of our box dumping machine associated with a field box conveyer or entrance conveyer such as may be found in the usual citrus packing house.

Fig. 2 is a top plan view of the machine shown in Fig. 1.

Fig. 5 is a detail, diagrammatic view of one of the chain tracks employed in our box dumping machine, and illustrating the vibrating or box jarring mechanism by which the boxes are jarred to remove the contents.

Fig. 6 is a detail view, similar to Fig. 5, illustrating the chain-jarring mechanism in another of its positions.

Fig. 7 is an enlarged detail sectional view taken through the chain track illustrated in Fig. 5.

Fig. 8 is an enlarged view of the vibrator and track section shown in Fig. 7, and taken along line VIII—VIII of that figure.

Figs. 9, 10, 11 and 12 are diagrammatic views illustrating the relative positions of the box and the conveyer chains during different stages of the passage of a box through our box dumping machine, Fig. 9 representing the position of the box as it enters our machine, Fig. 10 showing the box in its initial turning or inverting movement, Fig. 11 illustrating the final inverting movement of the box, and Fig. 12 illustrating the position of the box when it has arrived at the end of our box dumping machine and is being restored to its normal upright position;

Fig. 13 is a detail diagrammatic view of one of the chain tracks employed in our box dumping machine and illustrating a modified form of vibrating or box jarring mechanism;

Fig. 14 is an enlarged detail sectional view taken through the chain track illustrated in Fig. 13; and Fig. 15 is an enlarged sectional view of the track and vibrating mechanism illustrated in Fig. 14, said sectional view being taken along line XV—XV of Fig. 14.

Figure 3:
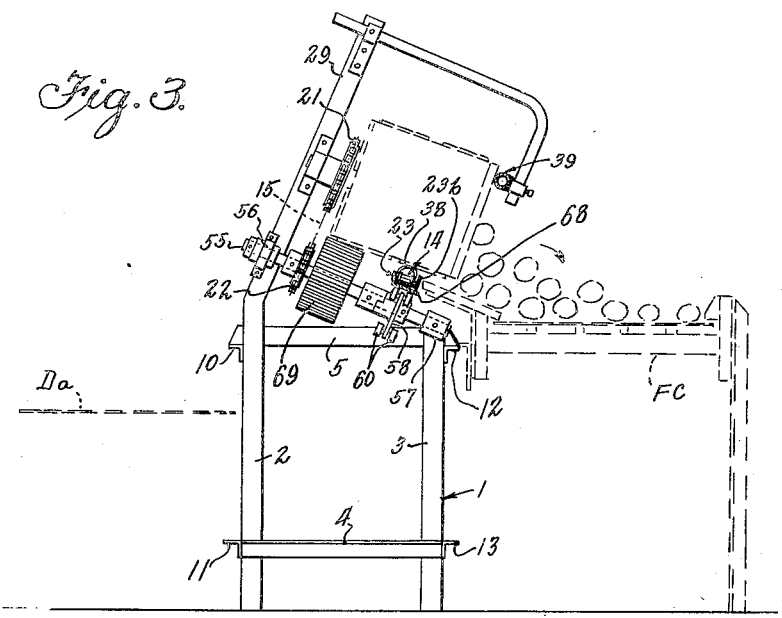
Fig. 3 is a vertical sectional view of the machine shown in Fig. 1, taken along line III—III of that figure.
Figure 4:
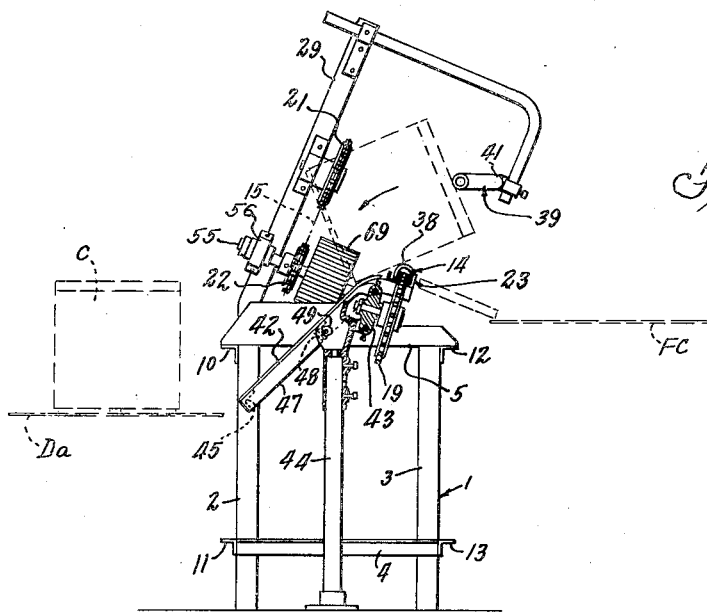
Fig. 4 is a sectional view, taken along line IV—IV of Fig. 1.

Referring to the drawings, we have illustrated our invention as comprising a suitable stand, framework, or table which may be constructed in any desired manner, though we prefer that the same shall comprise an end standard 1 consisting of vertical legs 2 and 3 interconnected by cross bars 4 and 5 to form a stand or leg structure for one end of the machine (see Fig. 3). The opposite end of the table is similarly formed by an end standard 6 constructed of vertical legs 7 and 8 interconnected by a cross bar 9. The standards 1 and 6 are interconnected by horizontal members 10 and 11 on one side of the machine, and a similar pair of horizontal members 12 and 13 on the opposite side of the machine.

It will be observed, therefore, that the table construction, including the end supports 1 and 6 and the horizontal members 10—13 will constitute a support along which a pair of endless chains 14 and 15 may move. The chain 14 is illustrated as extending around a drive sprocket 16 mounted upon a drive shaft 17, the chain 14 passing over an idler sprocket 18 at one end of the machine, and a second idler sprocket 19 at the opposite end of the machine. The chain 15 is illustrated as passing over a drive sprocket 20, also mounted upon the drive shaft 17 and at the opposite end of the machine the chain 15 passes over a pair of idler sprockets 21 and 22.

The upper portion of the chain 14, as it passes along the length of the stand or table, is supported upon a track 23 which is preferably formed in the shape of an inverted channel, as is illustrated particularly in Fig. 8, so as to constitute not only a horizontal support for the chains but also to act as a guide confining the movement of the chain to a relatively narrow path. Box dumping machines of this character are usually associated with a field box conveyor extending from the entrance of the packing house to the end, and we have illustrated our box dumping machine as being located at one end of such field box conveyer designated by the reference character B. The field box or entrance conveyer may be of any suitable type, such as a roller conveyer or belt conveyer, both of these types being well known in the art. We have illustrated the conveyer B as a belt conveyer having a belt Ba passing over a pulley Bb, and arranged to be driven by any suitable power means, not shown. Field boxes C, delivered to the packing house, will be placed upon the conveyer belt Ba and will be delivered by it in the direction of the arrow appearing upon the first box C shown in Fig. 1.

In order to start the boxes into our box dumping machine, and to deliver them to the chains 14 and 15, we provide a pair of feed rollers 24 and 25 rigidly secured to the drive shaft 17 to receive driving motive power therefrom. The shaft 17 is journaled upon the end standard 6 by means of suitable adjustable bearing members 26 and 27 attached to the upright legs 7 and 8, respectively. The location of the bearing members 26 and 27 and the diameter selected for the rollers 24 and 25 is preferably such that the upper level of the periphery of the rollers 24 and 25 is approximately aligned with the upper surface of the belt Ba so that boxes may pass directly from the belt Ba onto the rollers 24 and 25 without any substantial change in level thereof. The rollers 24 and 25, being power driven, will positively move the boxes into the box dumping machine and deliver them to the chains 14 and 15.

By referring particularly to Figs. 1 and 9, it will be noted that the track 23 extends through a substantially horizontal path, the level of which is at some distance above the upper surface of the rollers 24 and 25 and from an inspection of Fig. 2 it will be observed that the track 23 lies near one side, namely, the rear side, of the table of our machine so that boxes entering upon the rollers 24 and 25 will be so positioned that the track 23 and its chain 14 will lie along the side Cs of the box at a considerable distance above the bottom Cb thereof.

It will also be observed from an inspection of Figs. 1 and 2 that the chain 15 operates through an angularly disposed channel-shaped track 28, the end thereof nearest the entrance point of the boxes into our box dumping machine being at approximately the same level as the upper surface of the rollers 24 and 25 and being disposed at the forward side of the table in such position that as the boxes enter upon the rollers 24 and 25 the bottoms Cb of the boxes will pass directly above the track 28 and its chain 15, the chain being in a position to engage the bottom of the box near the front side thereof.

It will also be observed that the track 28 extends upwardly at a considerable angle to the vertical as it progresses along the length of the table and at the same time extends inwardly from the front side of the table to form an angular path for the chain 15, causing this chain to rise and move toward the rear of the table as it progresses along the length of the machine. The track 28 is supported in this angular position by having one of its ends secured to an extension 29 of the leg 2 which extension is bent inwardly to extend laterally over the table. An intermediate support 30 may be provided connected to the horizontal rails 10 and 11 which interconnect the front sides of the end standards 1 and 6, this auxiliary support 30 being likewise bent inwardly. In order to provide ample clearance between the auxiliary support 30 and the track 28, I prefer to mount a bracket 31 on the support 30 to extend inwardly of the table and engage the track at a point spaced inwardly from the support 30. Similarly, it may be observed from an inspection of Fig. 2 that the track 23 is preferably supported in its position spaced inwardly from the rear rail 12 of the table by a plurality of brackets 32 and 33.

It will therefore be observed that as a box is drawn inwardly into our box dumping machine, it will first pass upon the rollers 24 and 25 while held substantially level, and in this position it will be disposed with the chain 14 at one side of the box and the chain 15 beneath the bottom of the box. The chains 14 and 15 will then engage the box, each of the chains being constructed of parallel spaced links 34 alternating with pairs of spaced links 35, connected together by pins 36 and the groups of links being held in lateral spaced relation by spacing sleeves or rollers 37, as is illustrated in detail in Figs. 7 and 8. Opposed links 35 are interconnected by laterally extending inverted U-shaped box-engaging members 38 to engage with the side or bottom of the box. The chains will now take up the box and carry it through our machine, and as the box is conveyed through the machine it will pass from over the rollers 24 and 25 and will thereafter be supported directly by the chains 14 and 15, as shown in Fig. 10. In this position the box will have been turned slightly upon its side and as the box progresses through the machine and the level of the chain 15 rises, the box will be tipped or canted over upon its side to the position shown in Fig. 11, wherein the side of the box is now supported immediately above the chain 14, while the chain 15 has risen to such point that the bottom of the box has been turned up to substantially a vertical position or slightly beyond a vertical position. In this position the contents of the box will fall therefrom, the box being prevented from completely overturning by means of a guide bar 39 which extends substantially throughout the length of our machine at the rear side thereof.

The guide bar 39 is preferably bent in the shape shown in Figs. 1 and 2, so that it starts, at the entrance end of the machine, at a level slightly above the track 23 but rises sharply and is bent outwardly to the point indicated at 40, so as to engage the top portion of the box when the same has been inverted to the position shown in Fig. 11. From the point 40 the guide bar 39 extends in a substantially horizontal and straight direction to the point indicated at 41, so that during the passage of the box between the points 40 and 41 the box is supported in its substantially inverted position, and during this time all of the contents of the box will fall therefrom.

Our box dumping machine is preferably located adjacent a fruit conveyer FC which extends parallel to our box dumping machine in a position to receive the contents of the box when the box is inverted.

It will be noted that the guide bar 39 extends beyond the end frame 1 of the table, while the chain 15 and its track 28 terminates at the end frame 1, thus removing any support from the bottom of the box as soon as the box passes the end frame 1. At this point, therefore, (see Fig. 12) the box is entirely supported upon the chain 14 and it may tip back toward its upright position. In order to assist the box in its return to its upright position, we prefer to bend the guide bar 39 inwardly toward the end of the machine in the shape shown most clearly in Fig. 2.

It will also be observed that the chain 14 and its track extend beyond the end frame or stand 1 so that after the box has passed the end frame 1 it is engaged by the inwardly bent end of the guide bar 39 to swing the box back toward the vertical until it arrives at such position that it falls off of the side of the chain 14 onto a plate or slide 42 located at the extreme end of the machine. The plate 42 constitutes a surface along which the box may slide laterally out of the box dumping machine, at which point the boxes may be picked up and carried away by any well-known suitable means, ready for redelivery to the field.

If desired, an empty box conveyer D, partially illustrated herein as comprising a belt Da passing over a pulley Db, may be mounted immediately below and to the front of the slide 42 to receive the boxes and carry them automatically to any convenient location where they may be stacked ready for redelivery.

It will be observed that the idler sprocket 19 is mounted in spaced relation from the stand 1 in the direction of movement of the boxes, the idler sprocket 19 being supported in an auxiliary bearing 43 supported upon the upper end of a leg or post 44, and is held in rigid spaced relation from the end frame 1 by securing the auxiliary bearing 43 to the framework which supports the plate 42. This framework consists of a horizontal brace 45 secured to the leg 2 from which extends a pair of end frame members 46 and 47, an intermediate horizontal brace 48 being provided for rigidity, if desired. The auxiliary bearings 43 may be bolted to the end member 47, as indicated at 49.

It will therefore be observed that with the construction thus far described, boxes may be automatically delivered along an entrance conveyer B to the rollers 24 and 25 and be carried by these rollers into our box dumping machine where the boxes will be picked up by the chains 14, 15, conveyed along the length of the box dumping machine and inverted to remove their contents, and then be restored to their upright position and ejected from the machine at the end opposite to the entrance end thereof. It will also be observed that such box dumping machine is extremely simple in its construction, comprising essentially nothing more than a table, with two endless chains for carrying the boxes, one of which travels through an angular path both relative to the vertical and to the horizontal, the chains being guided in their path by a track which constitutes a mere channel-shaped structural member lying beneath the chain and following the desired path of movement of the chain.

The return portion of the chains may be suitably guided and supported in return tracks if desired and we have illustrated the return portion of the chain 14 as being supported through the major portion of its travel by means of a return track 50 secured in any suitable manner to the framework constituting the table. Similarly, the return portion of the chain 15 may be guided along the channel-shaped track 51 to prevent undue sagging of this chain during the return movement.

At the time the box is in its inverted or contents-ejecting position, as shown in Fig. 11, the weight of the box is supported by the chain 14. A jarring of the chain 14 by any suitable means will jar the box, assisting in the complete removal of the contents from the box. One method of jarring the chain is illustrated in Figs. 1 to 8 as comprising the separation of the track 23 into a plurality of sections in order to lend flexibility thereto, and lifting and lowering that section of the track over which the box passes while in its substantially inverted position. The track section 23a, 23b and 23c may be hinged together as indicated at 52 and 53, the end of the track section 23 being preferably hinged as indicated at 54 to the end member 47 constituting the frame to which the auxiliary bearing 43 is attached, this hinging of the track sections permitting relative vertical movement of the track sections without permitting horizontal or lateral displacement thereof. The outer end of the track section 23b extends slightly beyond the end frame 1 and immediately above a vibrator shaft 55 mounted in suitable bearings 56 and 57 upon the legs of the end frame 1.

By referring particularly to Figs. 3, 7 and 8, it will be observed that the vibrator shaft 55 carries a vibrator spider 58 of substantially triangular shape in the apex of each angle of which is mounted a pin 59 upon which rotates a pair of rollers 60, one on each side of the spider 58. The spider 58 has a hub 61 thereon through which the vibrator shaft 55 projects, but upon which the spider 58 is freely rotatable. The shaft 55 has a collar 62 rigidly fixed by means of a set screw 63. The collar 62 has a boss 64 projecting in the direction of the axis of the shaft 55 toward the hub 61 of the vibrator, and, as will be observed from an inspection of Fig. 7, this boss 64 is of substantially sector shape extending about the shaft 55 approximately through a distance of 90°. The hub 61 likewise has a boss 65 projecting toward the collar 62 and this boss is similarly sector-shaped and extends about the shaft 55 through an angle of about 90°, the bosses 64 and 65 constituting a lost motion connection or clutch transmitting rotary force from the shaft 55 to the spider 58. The spider 58 is held against movement longitudinally of the shaft 55 by means of a collar 66 secured to the shaft 55 by means of a set screw 67.

It will be noted that the idler sprocket 22 for the chain 15 is rigidly secured to the shaft 55 so that the driving force transmitted to the chain 15 is transmitted through the idler sprocket 22 to rotate the shaft 55.

Due to the substantially triangular shape of the spider 58 it will be apparent that as the shaft 55 is rotated one of the sets of rollers 60 will engage and lift the track section 23b until that set of rollers 60 has passed a vertical line drawn through the shaft 55 and the pin 59 for that set of rollers. At this point the weight of the track section 23b (and the box supported thereby) will tend to move the spider 58 in the direction of the arrow on Fig. 5, and since the spider 58 is free to rotate upon the shaft 55, the spider will move rapidly in a clockwise direction until the next succeeding set of rollers 60 engage the bottom of the track section 23b at which time the spider, rollers and track will be in the position shown in Fig. 6. In other words, the spider will move to a position in advance of the then position of the boss or lug 64. Then as the shaft 55 is steadily rotated in a clockwise direction the lug 64 will be brought again into engaging relation with the boss or lug 65 to positively drive the spider through another portion of its rotation until the next leg of the spider has passed "dead center", at which time the spider will snap over to its new position.

The effect of this movement of the spider 58 will be to lift the track section 23b (and the box) and then suddenly drop the box, again lift the box, and then suddenly drop the box again, three such lifting and dropping motions of the box occurring during each revolution of the shaft 55. This lifting and dropping of the box will jar the box, insuring that all of the fruit contained therein will fall out. A wear plate 68 may be provided on the underneath surface of the track section 23b to prevent excessive wear at this point due to the operation of the vibrator thereon. This wear plate may be formed of metal, if desired, though we prefer that it be formed of leather, rubber, or similar material which will act as a cushion to reduce the noise or shock of the contacting parts.

It may be found desirable to provide an additional support for the box while it is being jarred, and for this purpose we prefer to provide a feed roller 69 on the shaft 55 near the front side of the table, against which the bottom portions of the box may rest, as shown in Figs. 3 and 11. Also, the feed rollers 69 being rigidly secured to the shaft 55 will give the box a final feeding impulse toward the ejector plate 42, insuring that the box will be carried out of the machine after it has been dumped.

In Figs. 13, 14 and 15 we have illustrated a modified form of box jarring mechanism which may be adapted to our box dumping machine, this form of the jarring mechanism comprising the employment of an insert 70 secured in the track section 23b as by means of screws 71. The insert 70 has a length preferably extending throughout the major portion of the track section 23b and has a width slightly narrower than the distance between the spaced parallel links 34 of the chain 14. The upper surface of the insert 70 is provided with a plurality of notches or serrations 72 so as to provide undulating or wavy surface-engaging spacing rollers 31 of the chain, causing the chain to be lifted and dropped as the chain moves over the insert 70. The alternate lifting and dropping of the chain as it passes over the insert 70 will produce a jarring effect upon the box similar to that produced by the vibrator spider 58.

It will therefore be observed that we have provided a box dumping machine which is not only extremely simple in its construction, but which has a relatively small number of moving parts requiring attention, repair and adjustment, and, further, that the boxes conveyed through our box dumping machine will be given a positive jarring action at the time these boxes are substantially inverted to thereby insure complete removal of the contents therefrom.

While we have shown and described the preferred embodiment of our invention, we do not wish to be limited to any of the details of construction described herein, except as defined in the appended claims.

We claim:

1. In a box dumping machine, a table, a pair of conveyor chains extending longitudinally of said table to engage and carry boxes longitudinally across said table, one of said chains extending substantially horizontally along said table and disposed in a vertical plane substantially parallel to the longitudinal axis of said table and disposed near one side of said table to engage the side of a box at a considerable distance above the bottom thereof, and the other of said chains describing an angular path starting from a position disposed beneath the bottom of a box, near the side thereof opposite to the side engageable by said first chain as said box enters upon said table, and approaching the vertical plane of said first named chain as said second named chain progresses along the length of said table to thereby tip said box upon said first named chain to substantially invert the same to empty the contents from said box.

2. In a box dumping machine, a table, a pair of conveyer chains extending longitudinally of said table to engage and carry boxes longitudinally across said table, one of said chains extending substantially horizontally along said table and disposed in a vertical plane substantially parallel to the longitudinal axis of said table and disposed near one side of said table to engage the side of a box at a considerable distance above the bottom thereof, and the other of said chains describing an angular path starting from a position disposed beneath the bottom of a box, near the side thereof opposite to the side engageable by said first chain as said box enters upon said table, and approaching the vertical plane of said first named chain as said second named chain progresses along the length of said table to thereby tip said box upon said first named chain to substantially invert the same to empty the contents from said box, and means for vibrating said first named chain to jar said box while it is in its substantially inverted position.

3. In a box dumping machine, a table, a pair of conveyer chains extending longitudinally of said table to engage and carry boxes longitudinally across said table, one of said chains extending substantially horizontally along said table and disposed in a vertical plane substantially parallel to the longitudinal axis of said table and disposed near one side of said table to engage the side of a box at a considerable distance above the bottom thereof, and the other of said chains describing an angular path starting from a position disposed beneath the bottom of a box, near the side thereof opposite to the side engageable by said first chain as said box enters upon said table, and approaching the vertical plane of said first named chain as said second named chain progresses along the length of said table to thereby tip said box upon said first named chain to substantially invert the same to empty the contents from said box, a track for supporting said first named chain and vibrating means disposed beneath said track and engaging the same to vibrate said track to jar said box when it is in its substantially inverted position.

4. In a box dumping machine, a table, a pair of conveyer chains extending longitudinally of said table to engage and carry boxes longitudinally across said table, one of said chains extending substantially horizontally along said table and disposed in a vertical plane substantially parallel to the longitudinal axis of said table and disposed near one side of said table to engage the side of a box at a considerable distance above the bottom thereof, and the other of said chains describing an angular path starting from a position disposed beneath the bottom of a box, near the side thereof opposite to the side engageable by said first chain as said box enters upon said table, and approaching the vertical plane of said first named chain as said second named chain progresses along the length of said table to thereby tip said box upon said first named chain to substantially invert the same to empty the contents from said box, a track for supporting said first named chain including a section movable in a vertical plane disposed at the point along the path of travel of said box at which the box is substantially inverted, and a vibrating means for engaging and jarring said vertically movable section of said track to insure complete emptying of said box.

5. In a box dumping machine, a table, a pair of conveyer chains extending longitudinally of said table to engage and carry boxes longitudinally across said table, one of said chains extending substantially horizontally along said table and disposed in a vertical plane substantially parallel to the longitudinal axis of said table and disposed near one side of said table to engage the side of a box at a considerable distance above the bottom thereof, and the other of said chains describing an angular path starting from a position disposed beneath the bottom of a box, near the side thereof opposite to the side engageable by said first chain as said box enters upon said table, and approaching the vertical plane of said first named chain as said second named chain progresses along the length of said table to thereby tip said box upon said first named chain to substantially invert the same to empty the contents from said box, a track for supporting said first named chain including a section movable in a vertical plane disposed at the point along the path of travel of said box at which the box is substantially inverted, including means for lifting said vertically movable section of said track for jarring said box when in its substantially inverted position to insure complete removal of the contents therefrom.

6. In a box dumping machine, a table, a pair of conveyer chains extending longitudinally of said table to engage and carry boxes longitudinally across said table, one of said chains extending substantially horizontally along said table and disposed in a vertical plane substantially parallel to the longitudinal axis of said table and disposed near one side of said table to engage the side of a box at a considerable distance above the bottom thereof, and the other of said chains describing an angular path starting from a position disposed beneath the bottom of a box, near the side thereof opposite to the side engageable by said first chain as said box enters upon said table, and approaching the vertical plane of said first named chain as said second named chain progresses along the length of said table to thereby tip said box upon said first named chain to substantially invert the same to empty the contents from said box, a track for supporting said first named chain, vibrating means disposed beneath said track and engaging the same to vibrate said track to jar said box when it is in its substantially inverted position, and additional means for engaging said box at a point adjacent said vibrating means and spaced laterally from said first named chain to support said box during said jarring operation.

7. In a box dumping machine, a table, a pair of conveyer chains extending longitudinally of said table to engage and carry boxes longitudinally across said table, one of said chains extending substantially horizontally along said table and disposed in a vertical plane substantially parallel to the longitudinal axis of said table and disposed near one side of said table to engage the side of a box at a considerable distance above the bottom thereof, and the other of said chains describing an angular path starting from a position disposed beneath the bottom of a box, near the side thereof opposite to the side engageable by said first chain as said box enters upon said table, and approaching the vertical plane of said first named chain as said second named chain progresses along the length of said table to thereby tip said box upon said first named chain to substantially invert the same to empty the contents from said box, a track for supporting said first named chain including a section movable in a vertical plane disposed at the point along the path of travel of said box at which the box is substantially inverted, vibrating means including a shaft disposed beneath said movable track section, a spider rotatable by said shaft and engageable with said track section, a lost-motion connection between said spider and said shaft whereby said shaft will drive said spider to lift said track and then free said spider to allow said track to descend rapidly to produce a jarring action on said box.

8. In a box dumping machine, means forming an elongated table over which boxes may pass, conveyer means on said table for carrying boxes longitudinally across said table, said conveyer means including a pair of endless chains, means defining a path of movement for one of said chains in a substantially horizontal direction longitudinally of said table and in a vertical plane parallel to the longitudinal axis of said table to engage the side of a box entering upon said table at a point spaced a considerable distance above the bottom of said box, means defining a path of movement for the other of said chains starting from a position disposed beneath the bottom of a box at the side thereof opposite to the side engageable by said first named chain as said box enters upon said table and gradually rising to a higher level than the level of said first named chain and approaching the vertical plane of said first named chain, and a pair of feed rollers at the entrance end of said table for engaging the bottom of a box to support the box and move the same onto said chains, the upper surface of said rollers being substantially at the level of the starting point of the path of said second named chain.

9. In a box dumping machine, means forming an elongated table over which boxes may pass, conveyer means on said table for carrying boxes longitudinally across said table, said conveyer means including a pair of endless chains, means defining a path of movement for one of said chains in a substantially horizontal direction longitudinally of said table and in a vertical plane parallel to the longitudinal axis of said table to engage the side of a box entering upon said table at a point spaced a considerable distance above the bottom of said box, means defining a path of movement for the other of said chains starting from a position disposed beneath the bottom of a box at the side thereof opposite to the side engageable by said first named chain as said box enters upon said table and gradually rises to a higher level than the level of said first named chain and approaching the vertical plane of said first named chain, to rotate a box about said first named chain as it passes along said table to substantially invert the same and empty the contents therefrom, the longitudinal extent of the path of said second named chain terminating short of the longitudinal extent of the path of said first named chain, whereby a box will be released by said second named chain while it is in its inverted position, and will be tipped back by gravity about said first named chain toward an upright position.

10. In a box dumping machine, means forming an elongated table over which boxes may pass, conveyer means on said table for carrying boxes longitudinally across said table, said conveyer means including a pair of endless chains, means defining a path of movement for one of said chains in a substantially horizontal direction longitudinally of said table and in a vertical plane parallel to the longitudinal axis of said table to engage the side of a box entering upon said table at a point spaced a considerable distance above the bottom of said box, means defining a path of movement for the other of said chains starting from a position disposed beneath the bottom of a box at the side thereof opposite to the side engageable by said first named chain as said box enters upon said table and gradually rises to a higher level than the level of said first named chain and approaching the vertical plane of said first named chain to rotate a box about said first named chain as it passes along said table to substantially invert the same and empty the contents therefrom the longitudinal extent of the path of said second named chain being less than the extent of the path of said first named chain, and a feed roller mounted on said machine at the terminus of the path of movement of said second named chain for engaging and supporting a box when it is freed by said second named chain to move said box to a further position in the direction of the axis of said table.

11. In a box dumping machine, means forming an elongated table over which boxes may pass, conveyer means on said table for carrying boxes longitudinally across said table, said conveyer means including a pair of endless chains, means defining a path of movement for one of said chains in a substantially horizontal direction longitudinally of said table and in a vertical plane parallel to the longitudinal axis of said table to engage the side of a box entering upon said table at a point spaced a considerable distance above the bottom of said box, means defining a path of movement for the other of said chains starting from a position disposed beneath the bottom of a box at the side thereof opposite to the side engageable by said first named chain as said box enters upon said table and gradually rises to a higher level than the level of said first named chain and approaching the vertical plane of said first named chain, a pair of feed rollers at the entrance end of said table for engaging the bottom of a box to support the box and move the same onto said chains, the upper surface of said rollers being substantially at the level of the starting point of the path of said second named chain to rotate a box about said first named chain to substantially invert the same and empty the contents therefrom, the longitudinal extent of the path of said second named chain terminating short of the longitudinal extent of the path of said first named chain, whereby a box will be released by said second named chain while it is in its inverted position and will be tipped back by gravity about said first named chain toward an upright position, an exit slide for receiving said box as it returns to its upright position to eject said box laterally from said machine, and a guide bar extending along the length of said machine to engage the upper edge of said box when the same is inverted, the end of said guide bar adjacent the extended portion of said first named chain being bent laterally across the table to tip said box back toward its upright position when said box is supported solely by said first named chain.

12. In a box dumping machine, a supporting table, means for conveying boxes across said table, including an endless chain extending longitudinally of said table to engage a box and carrying the same across the said table, means for pivoting a box about said chain to substantially invert the same as said box moves across said table, means for jarring said chain while said box is in said substantially inverted position to assist in the removal of the contents from said box, a track for supporting said chain, means associated with said track for lifting and lowering said chain as said chain passes along said track, said jarring means including means on said track for engaging said chain and presenting an undulating surface thereto over which said chain will pass to cause said chain to be lifted and lowered.

13. In a box dumping machine, a supporting frame including a conveyer supporting means thereon, an endless chain box conveyer extending longitudinally of said frame and adapted to engage boxes to carry the same across said frame, an endless chain supported by said frame and arranged to cause said boxes to rotate around said first mentioned chain in their path of travel over said supporting frame so as to substantially invert said boxes.

HENRY J. MINTERT.
JOHN B. TATE.